United States Patent [19]

Yasuda et al.

[11] Patent Number: 4,749,457
[45] Date of Patent: Jun. 7, 1988

[54] PRECIPITATION OF COLLOIDAL MATERIALS FROM AQUEOUS SYSTEMS BY ELECTROCHEMICAL RELEASE OF METALLIC FLOCCULATING AGENTS AND DYNAMIC BIMETALLIC CELL FOR USE THEREIN

[75] Inventors: Hirotsugu Yasuda, Newburg; Stig E. Friberg, Rolla, both of Mo.

[73] Assignee: The Curators of the University of Missouri, Columbia, Mo.

[21] Appl. No.: 829,153

[22] Filed: Feb. 14, 1986

Related U.S. Application Data

[63] Continuation of Ser. No. 582,097, Feb. 21, 1984, abandoned.

[51] Int. Cl.$^4$ .............................................. C02F 1/46
[52] U.S. Cl. .................................. 204/150; 204/130; 204/248; 204/249; 204/275; 204/284; 204/290 R; 204/292; 204/302
[58] Field of Search .............. 204/150, 248, 197, 302, 204/249, 275, 284, 290 R, 292; 210/748

[56] References Cited

U.S. PATENT DOCUMENTS

| | | |
|---|---|---|
| 1,222,637 | 4/1917 | Landreth ............................ 204/150 |
| 2,724,688 | 11/1955 | Gruner ............................... 204/248 |
| 3,256,504 | 6/1966 | Fidelman ........................... 204/150 |
| 3,392,102 | 7/1968 | Koch .................................. 204/150 |
| 3,425,925 | 2/1969 | Fleischman ....................... 204/150 |
| 3,474,014 | 10/1969 | Aul ..................................... 204/150 |
| 3,928,155 | 12/1975 | Woodhouse ...................... 204/150 |
| 4,152,229 | 5/1979 | Soltys et al. ...................... 204/150 |

Primary Examiner—T. Tung
Attorney, Agent, or Firm—Grace J. Fishel

[57] ABSTRACT

A method of precipitating colloidal materials from aqueous systems and a dynamic bimetallic galvanic cell is disclosed, said cell including a metallic electrode which provides a source of flocculating agent and an inert electrode to which the metallic electrode is short circuited. When water containing colloidal particles is passed through the galvanic cell and the electrodes are short circuited, the metallic electrode provides a source of flocculating agent which coprecipitates with the colloidal particles, forming a sediment which can be readily removed. The cell is constructed to maximize the contact between the water and the electrode surfaces and to maintain the metallic electrode short circuited against the inert electrode as the metallic electrode is consumed.

7 Claims, 3 Drawing Sheets

PRECIPITATION OF COLLOIDAL MATERIALS FROM AQUEOUS SYSTEMS BY ELECTROCHEMICAL RELEASE OF METALLIC FLOCCULATING AGENTS AND DYNAMIC BIMETALLIC CELL FOR USE THEREIN

This is a continuation of application Ser. No. 582,097, filed Feb. 21, 1984, now abandoned.

The present invention relates to the precipitation of colloidal materials from aqueous systems by electrochemical release of metallic flocculating agents without application of external voltage and to a dynamic bimetallic galvanic cell for removing colloidal particles from water.

Contaminants which are heavier than water can be removed by conventional mechanical techniques as can those which float. Colloidal materials, on the other hand, are difficult to remove either for collection or for purification, as for example in the pretreatment of water to be desalinized by reverse osmosis.

In desalinization by reverse osmosis, sea water is forced under hydraulic pressure through a semipermeable membrane which is capable of filtering out salt. Since sea water contains a substantial amount of colloidal silica among other colloidal materials, it must be pretreated to remove the colloidals otherwise they will plug the membrane which adversely affects water pretreatment of sea water but it has application to the precipitation of colloidal materials from aqueous systems in general.

The common way to remove colloidal materials is by adding one or more flocculating agents in the form of their soluble metal salts. One difficulty with this method is that anions of the flocculating metals are introduced as contaminants. Attempts have been made to overcome this difficulty by the electrochemical release of flocculating agents from a cathode by passage of an electric current from an external power supply through the system. This has not proved to be entirely satisfactory, however, because of high power consumption and because the electrodes tend to scale and lose efficiency with time.

In view of the above, there is a need for an improved method for removing colloidal materials from water and for equipment useful therein. It is therefore an object of the present invention to provide a method of precipitating colloidal materials by the electrochemical release of metallic flocculating agents without application of an external voltage and to provide and features will be in part apparent and in part pointed out hereinafter. The invention accordingly comprises the methods and constructions hereinafter described, the scope of the invention being indicated by the subjoined claims.

In the accompanying drawings, in which several of various possible embodiments of the invention are illustrated and in which corresponding reference characters refer to corresponding parts, FIG. 1 is a schematic view of a bimetallic galvanic cell in accordance with the present invention;

Figure 1:
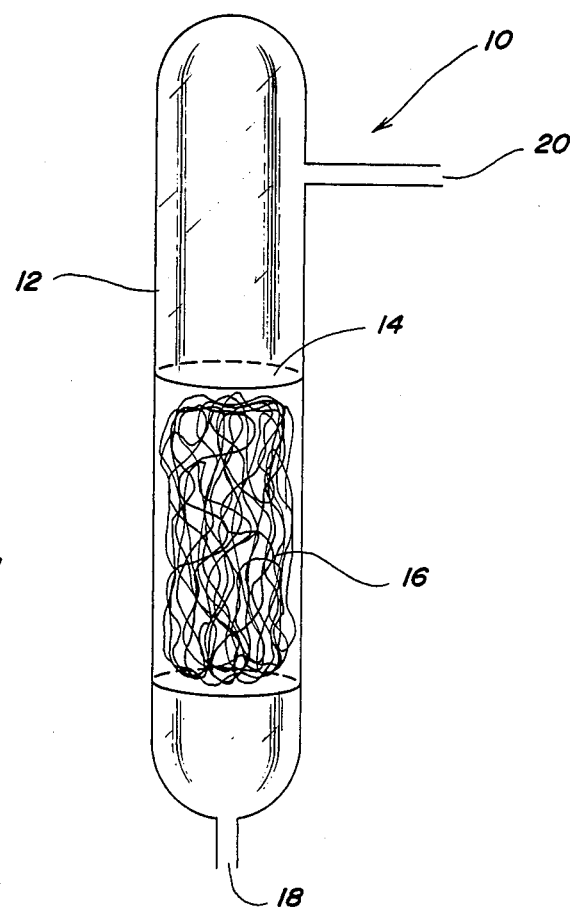

According to the present invention, water containing colloidal materials is passed through a bimetallic galvanic cell, the anode of which is capable of serving as a source of flocculating agent. Suitable metals in the past include iron, lead, magnesium and zinc but for use in the present invention aluminum is preferred. The metal anode may be constructed of pure aluminum but other metals such as those listed above, may be present in non-interferring amounts.

In the above-mentioned galvanic cell, the anode is connected to an inert electrode which is electronegative as compared to the anode at which a process of oxidative reduction occurs. Inert electrodes used in the past include carbon but in the present invention when the anode is aluminum, platinum is preferred as it seems to play a role in activating the oxidative corrosion of the aluminum, the oxide of which in water, acts as a flocculating agent. To electrically complete the cell, the anode is short circuited to the cathode. Since the anode corrodes and erodes away, it is important that the cell be configured in such a way that the necessary contact between the anode and cathode be continuously reestablished by force of the water flowing through the cell. It is preferred that the cell also be configured with as many contact points as possible to assure good short circuit contact between the anode and the cathode as given contact points are broken and reestablished.

Since oxygen is consumed in the oxidation of the aluminum, it must be present in the solution being treated. That amount which is normally dissolved under atmospheric conditions, i.e. about 5.0 to 6.0 ppm, is sufficient and there is no commensurate benefit in oxidating the water further. In addition to oxygen, it is essential that the solution contain a minimal amount of chloride ion. The function of the chloride is not entirely understood but that amount in sea water, i.e. about 3.5%, is amply sufficient.

In the present invention, the solution being treated is flowed through a vessel having an inlet and an outlet and containing the electrodes. The rate of colloidal removal in the dynamic bimetallic galvanic cell used in accordance with the present invention is enhanced by higher flow rates at least until the aluminum electrode is activated, larger platinum electrode surface areas and, above all, by a preconditioned (activated) aluminum electrode. The rate is detrimentally affected by reducing the dissolved oxygen content in the solution.

The performance characteristics of the dynamic bimetallic galvanic cell used in the present invention are better than those of a static cell and approach those of a cell to which an external voltage is applied. For example, a sea water model solution having 100 ppm colloidal silica treated in accordance with the present invention is reduced in colloidal silica content to about 5 ppm. With a static bimetallic galvanic cell of aluminum/platinum, the silica content is only reduced to about 7 ppm, whereas when an external voltage is applied, the silica content drops to about 3.5 ppm. The applied voltage system, however, has high power requirements and the electrodes tends to scale in time.

In a simple form, as shown in FIG. 1, a bimetallic galvanic cell 10 consists of a glass tube 12 into which a platinum cylinder 14 is inserted. The platinum cylinder is packed with purified aluminum foil which is cut into thin strips 16. One end of tube 12 is designated an inlet 18 with the other end becoming an outlet 20. Impure water is pumped into inlet 18, through bimetallic galvanic cell 10 from which it emerges through outlet 20. The turbulence caused by passing through cell 10 and the flow rate of the water keeps the flocculated colloidal material in suspension until it exist the system but when allowed to stand quiescent may be easily removed by typical mechanical means such as decanting, filtrating, centrifuging or the like.

Figure 2:
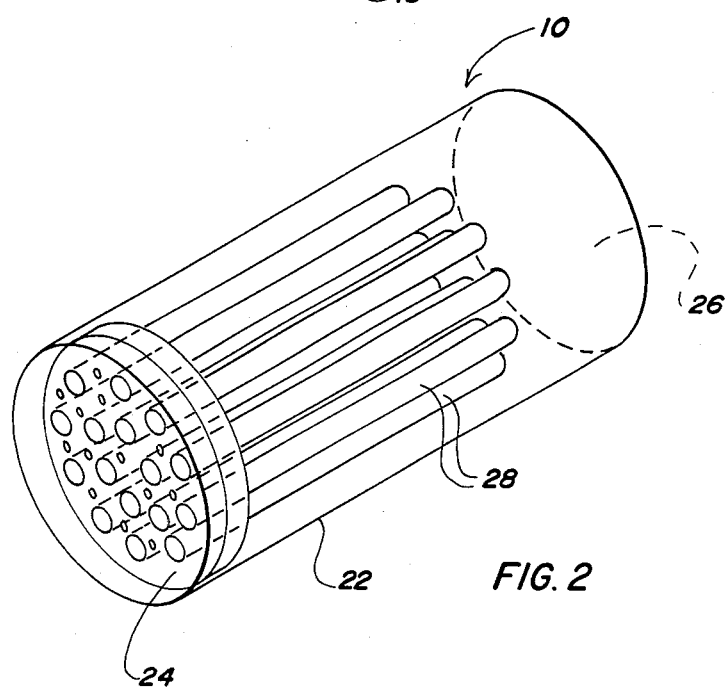
FIG. 2 is a side elevational view, partly in section, showing another bimetallic galvanic cell in accordance with the present invention; and, FIG. 3 shows relative absorbance versus contact time at different solution flow rates.

As shown in FIG. 2, a bimetallic galvanic cell 10' comprises a plastic cartridge 22 with a perforated end cap 24 and an inlet 26. End cap 24 includes a plurality of fingers 28 projecting axially into the cartridge 22. The inside of cartridge 22 and end cap 24 is platinated as is the outside of fingers 28. Strips, fibers or the like of aluminum 30 are packed into cartridge 22 around fingers 28. When water is flowed through the cell, from right to left, as shown in FIG. 2, the flow of the water keeps the aluminum short circuited against the platinated surface, thus reducing any cell inefficiency which might be caused by spot corrosion. In addition, it maintains the aluminum in short circuited contact with the platinum as it is being electrochemically consumed.

As will be appreciated, an important feature of galvanic cell 10' is that it can be inserted into a water pipeline without making any other change in the system and it is also reusable. More particularly since the cathode is inert, when the anode is consumed, the cell can be removed like a cartridge, the anode replenished and the cell reinserted in the line.

In the following examples, simulated sea water was prepared from 3.5% sodium chloride aqueous solution to which 100 ppm colloidal silica (Ludox HS-30, E. I. duPont de Nemours & Co., Inc., Wilmington, Del.) had been added. This solution was then run through a bimetallic galvanic cell like that shown in FIG. 1 wherein tube 12 was 25 cm in length and had a 25 mm I.D. In the first electrode configuration (not shown in FIG. 1), an aluminum cylinder (purified foil, J. T. Baker Company, Phillipsburg, N.J.) was inserted into the glass tube and a smaller diameter platinum cylinder was inserted inside the aluminum cylinder. Platinum wires were used to establish electrical contact between the two metals. In the second electrode configuration, as shown in FIG. 1, a platinum cylinder was inserted in the tube and packed with aluminum foil cut into thin strips.

The galvanic cell was connected to a sealless magnetic drive centrifugal pump, with variable flow control, by means of Tygon tubing. Three liters of simulated sea water containing 100 ppm of colloidal silica was pumped through the galvanic cell and collected in a 3 liter storage bottle. The same solution was pumped through the cell 10 to 20 times and samples were collected after each run, centrifuged and the filtrate analyzed for silica and aluminum content.

The amount of silica left in the solution was determined by reacting the silica in the form of orthosilicic acid with molybdate to form the 1:12 silicomolybdic acid. For this purpose, a Silica Reagent Solution was made up from a Solution A consisting of 41.0 ml 95% sulfuric acid in 800 ml water and diluted to 7 liters (1.5 N) and a Solution B consisting of 100 g $(NH_4)_6Mo_7O_{24} \cdot H_2O$ (molecular weight 1235.6) in 900 ml water to which 47 ml of concentrated ammonium hydroxide solution (28% NH) is added and diluted to 1 liter. To make up the Silica Reagent Solution 200 ml of Solution A and 100 ml of Solution B were added to 500 ml water making a total volume of 800 ml. This solution was stable for about a week.

To analyze the silica content after each run, a 25 ml sample was boiled with solid NaOH for 10 minutes in order to concentrate the silica for analysis. After the sample had been boiled, it was immediately acidified with concentrated sulfuric acid to pH 1.5 and diluted to 25 ml. Ten ml of the concentrated, acidified sample was added to 40 ml of the Silica Reagent Solution described above and the absorbance measured at 410 nm. Since the maximum absorbance occurs after about 2 minutes and changes with time, the concentrated, acidified sample should be mixed with the Silica Reagent Solution shortly before the absorbance is measured.

The aluminum ion concentration was also measured after each run. This was done by back complexometric titration using Eriochrome Black T as described by A. I. Vogel in "A Text-Book of Quantitative Inorganic Analysis", John Wiley and Sons, Inc., New York, NY (1961), p. 425. For this purpose a 0.01 M aluminum ion solution was made by dissolving 1.20 g of hydrated potassium aluminum sulfate in 250 ml of water and a 0.01 M EDTA solution was made by dissolving 1.861 g of ethylenediaminetetra-acetate in deionized water and diluting to 500 ml in a volumetric flask. To 25 ml of the aluminum ion solution was added a slight excess of the 0.01 M EDTA and the pH was adjusted to between 7-8 by the addition of ammonia solution. The solution was boiled for a few minutes to ensure complete complexation of the aluminum, cooled to room temperature and the pH adjusted to between 7 and 8. A few drops of Eriochrome Black T (Erio T) indicator was added and the sample titrated rapidly with standard 0.01 M zinc sulfate solution until the color changes from blue to wine-red. Every ml difference between the volume of 0.01 M EDTA added and the 0.01 M $ZnSO_4$ solution used in the back titration equals 0.2698 mg of Al.

The amount of dissolved oxygen (ppm) of the solution was determined with an Orion Research Model 97-08 oxygen electrode connected to an Orion 901/microprocessor. After every third cycle of the simulated sea water through the cell, 50 ml of solution was placed in a sample tube, the oxygen electrode inserted in the tube, and the oxygen content recorded after the reading had stabilized, normally 2 to 5 minutes after insertion of the oxygen electrode.

EXAMPLE 1

Figure 3:
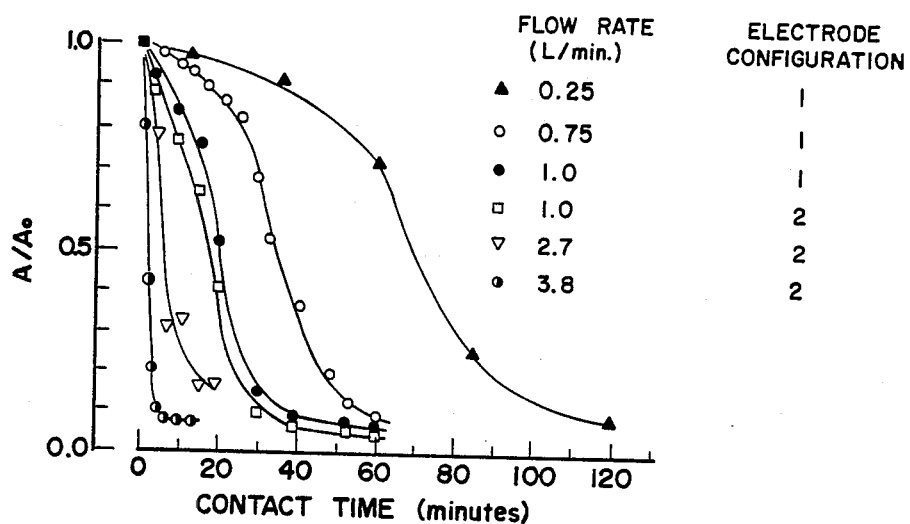

FIG. 3 shows a plot of the relative absorbance $A/A_o$, of the yellow colored silicomolybdic acid at 410 nm as a function of the time the solution was in contact with the electrodes, hereinafter called the contact time, for different flow rates. $A_o$ is the absorbance of the base solution containing about 100 ppm colloidal silica.

As shown in FIG. 3, there was an initially slow rate of silica removal for short contact times. This demonstrates that there is an induction period for corrosion to start on the aluminum electrode during which the cell operates less efficiently. The fact that this induction period appears to be missing at the two highest flow rates can be interpreted as requiring a certain volume of solution to contact the electrodes for corrosion to start occurring appreciably and this occurs sooner as the flow rate is increased. The decrease in induction period could also be due to increased turbulence of the flow through the cell as flow rate increases. In any case, once the rate of corrosion of the aluminum electrode is efficient, the silica content of the sea water is rapidly reduced and reaches a steady state value of approximately 5 ppm, i. e., a reduction of approximately 95%.

FIG. 3 also shows a comparison of the two electrode configurations used in the study. At a flow rate of about 1.0 liter per minute, the configuration shown in FIG. 1 in which aluminum is cut into strips and inserted in the platinum cylinder is slightly better at removing the silica at all contact times. This could be due to the increased turbulence caused by the packing and the better contacting of the solution and the electrodes.

EXAMPLE 2

Figure 4:
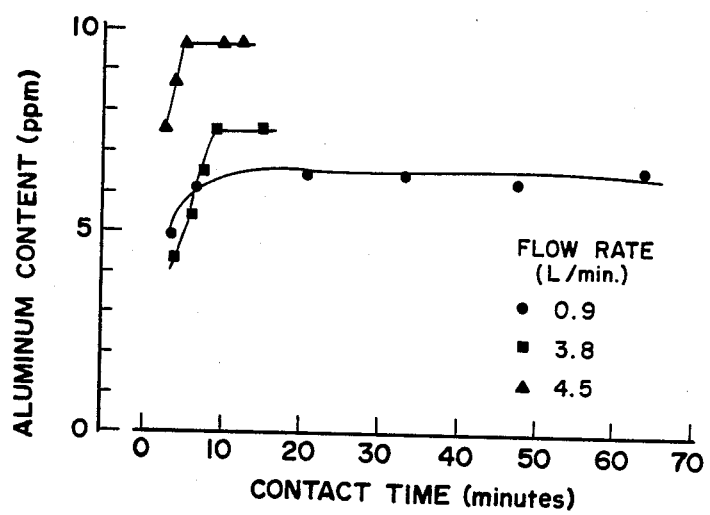
FIG. 4 shows aluminum content of the solution versus contact time at various solution flow rates.

FIG. 4 demonstrates that the aluminum content of the solution increases with contact time as expected and the content is higher at higher flow rates. Also, the content appears to reach a saturation value as contact time increases. Typical curves of aluminum content versus contact time are shown in FIG. 4.

EXAMPLE 3

Figure 5:
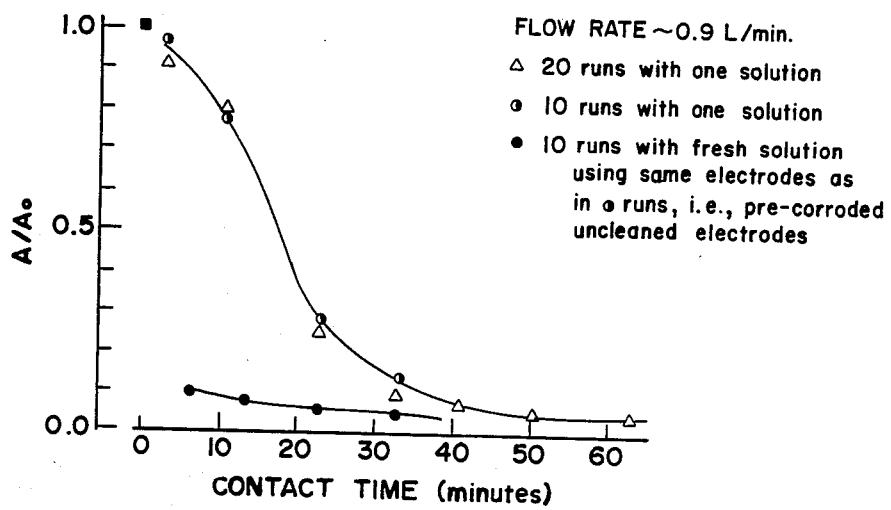
FIG. 5 shows effect of aluminum electrode condition on relative absorbence.

FIG. 5 demonstrates the effect of the state of the aluminum electrode. One 100 ppm colloidal silica solution was pumped through the cell 10 times at a flow rate of about 0.9 l/min with a contact time about 3 min/run. The plot of $A/A_o$ versus contact time, shown in FIG. 5, shows the same type of curve for the decrease in silica content as shown earlier in FIG. 3. However, when a new base solution containing 100 ppm silica is run through the cell, with an already corroded aluminum electrode, there is no induction time and the silica content decreases by more than 90% in about 5 minutes.

EXAMPLE 4

Figure 6:
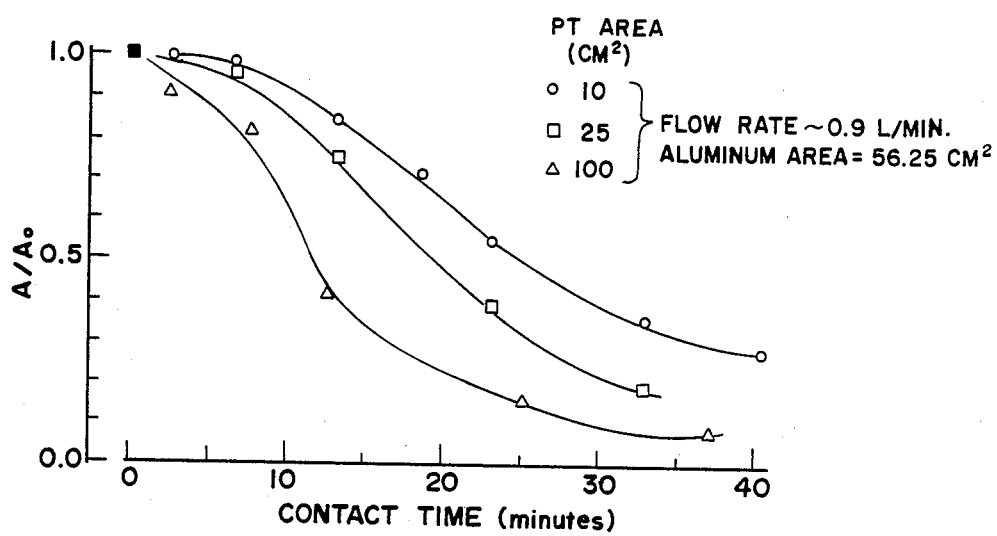
FIG. 6 shows effect of the size of the platinum electrode on relative absorbence versus contact time.

FIG. 6 shows the effect of platinum electrode surface area upon the rate of silica removal when an identical base solution is run through the cell with a platinum electrode surface area of 10 sq cm, 25 sq cm and 100 sq cm, respectively. As can be seen from FIG. 6, the size of the platinum electrode surface area affects the rate of silica removal with the bigger platinum surface area electrode reducing the silica content faster than the smaller ones.

EXAMPLE 5

Figure 7:
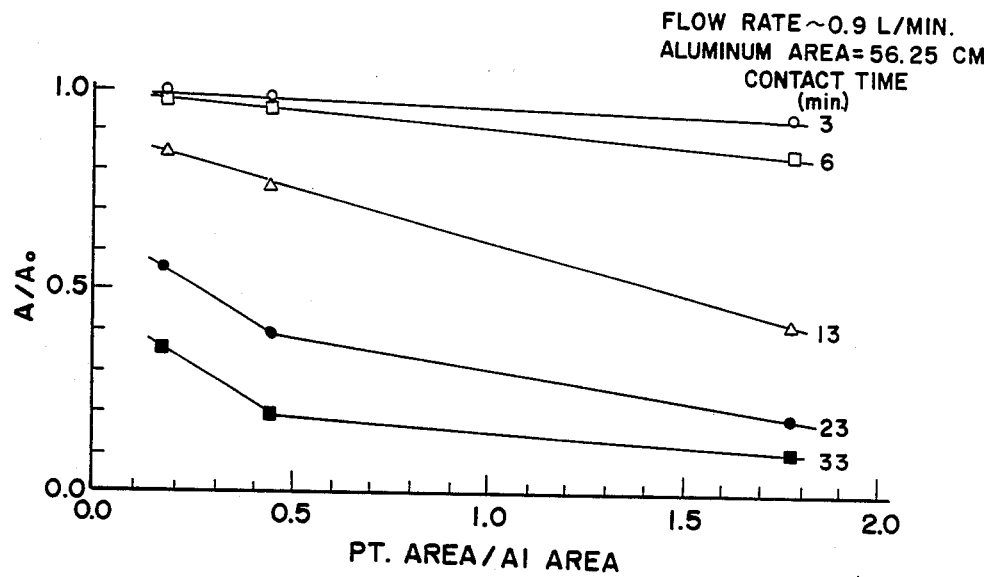
FIG. 7 shows effect of platinum area on relative absorbence.

FIG. 7 shows that the silica removed from the solution at a given contact time is directly proportional to the surface area of the platinum electrode. At longer contact times, the direct proportionality does not hold because for the cell in which a 100 sq cm platinum electrode was employed, the silica content had already reached its final level.

EXAMPLE 6

Figure 8:
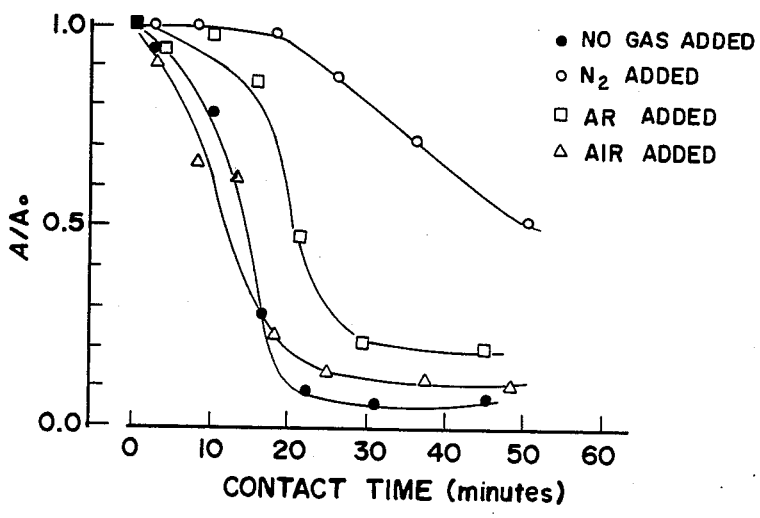
FIG. 8 shows effect of the addition of various gases to the solution on the relative absorbance.

FIG. 8 shows the effect of enriching or depleting the dissolved oxygen content of the sea water prior to the start of a run by bubbling the gas into the delivery tank at a set flow rate until the oxygen content attained a stable level. In this experiment, the platinum electrode was 25 sq cm and the aluminum electrode was 56.25 sq cm, with the aluminum cut into thin strips and inserted into a platinum cylinder as described earlier and shown in FIG. 1. The addition of argon and nitrogen at flow rates of 1.0 and 1.1 l/min, respectively, decreased the average amount of dissolved oxygen in the solution from 5.2 ppm for a solution with no gas added, to 1.34 ppm and 1.30 ppm, respectively. These decreases in oxygen level decreased the rate of silica removal due to decreased corrosion of the aluminum electrode. The addition of air, at a flow rate of 0.5 l/min did not significantly change the oxygen level of the solution but lowered it to 5.0 ppm from 5.2 ppm. Similarly, the rate of silica removal for the air addition cases is nearly the same as that for the case where no gas was added.

In view of the above, it will be seen that the several objects of the invention are achieved and other advantageous results attained. As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of precipitating colloidal materials which comprises flowing water containing colloidal materials and having chloride and dissolved oxygen through a vessel comprising
    (a) an inlet and an outlet for the water,
    (b) an aluminum electrode formed as a plurality of members,
    (c) a platinum electrode against which the aluminum electrode is short circuited at a plurality of discrete sites around which the water is flowed when said electrodes are positioned between the inlet and the outlet, and
    (d) means for maintaining the aluminum electrode short circuited against the platinum electrode at a plurality of sites as the aluminum electrode is consumed whereby the aluminum electrode serves as a source of flocculating agent, the platinum electrode activates the aluminum electrode to undergo spot corrosion at said contact sites and the aluminum electrode is moved by the flow of water as it is consumed such that the aluminum electrode continues to be short circuited against the platinum electrode at a plurality of discrete sites and the colloidal materials are precipitated by the aluminum flocculating agent released at said contact sites.

2. The method according to claim 1 wherein the water to be treated contains about 5.0 to 6.0 ppm dissolved oxygen and an effective amount of chloride ion.

3. The method according to claim 2 wherein the vessel has a perforated end cap forming the outlet and wherein the platinum electrode is plated on the inner surface of the vessel and the aluminum electrode comprises a plurality of strips packed in said vessel.

4. The method according to claim 2 wherein the vessel has a perforated end cap forming the outlet and wherein a plurality of fingers project inside said vessel from the outlet end cap towards the inlet and wherein the platinum electrode is plated on the outer surface of said fingers.

5. The method of claim 4 wherein the platinum electrode is additionally plated on the inner surface of the vessel and the end cap.

6. A vessel for precipitating colloidal materials from water containing chlorine and dissolved oxygen, said vessel comprising
    (a) an inlet and a perforated end cap forming an outlet for the water, said perforated end cap having a plurality of fingers projecting inside said vessel from the outlet end cap towards the inlet (b) an aluminum electrode formed as a plurality of strips placed in said vessel,
(c) a platinum electrode plated on the inner surface of the vessel and on the outer surface of said fingers against which the aluminum electrode is short circuited at a plurality of discrete sites around which the water is flowed with said electrodes positioned between the inlet and the outlet, and
(d) means for maintaining the aluminum electrode short circuited against the platinum electrode at a plurality of sites as the aluminum electrode is consumed. (whereby the aluminum electrode serves as a source of flocculating agent, the platinum electrode activates the aluminum electrode to undergo spot corrosion at said contact sites and the aluminum electrode is moved by the flow of water as it is consumed such that the aluminum electrode continues to be short circuited against the platinum electrode at a plurality of discrete sites and the colloidal materials are precipitated by the aluminum flocculating agent released at said contact sites.

7. The cell according to claim 6 wherein the platinum electrode is additionally plated on the inner surface of the end cap.

* * * * *